United States Patent [19]

Mollet

[11] 4,314,815
[45] Feb. 9, 1982

[54] PROCESS FOR THE PRODUCTION OF DYESTUFF PREPARATIONS

[75] Inventor: Hans Mollet, Bottmingen, Switzerland

[73] Assignee: Ciba-Geigy Corporation, Ardsley, N.Y.

[21] Appl. No.: 130,305

[22] Filed: Mar. 14, 1980

Related U.S. Application Data

[63] Continuation of Ser. No. 880,253, Feb. 22, 1978, abandoned, which is a continuation of Ser. No. 633,340, Nov. 19, 1975, abandoned, which is a continuation of Ser. No. 473,046, May 24, 1974, abandoned, which is a continuation of Ser. No. 224,936, Feb. 9, 1972, abandoned.

[30] Foreign Application Priority Data

Feb. 19, 1971 [CH] Switzerland .................... 2447/71

[51] Int. Cl.³ .................... C09B 67/42; C09B 67/04
[52] U.S. Cl. .................... 8/524; 8/598
[58] Field of Search .................... 8/524, 598

[56] References Cited

U.S. PATENT DOCUMENTS

| | | | |
|---|---|---|---|
| 543,601 | 7/1892 | Kerfort | 424/361 |
| 1,054,039 | 2/1913 | Schmidt et al. | 8/611 |
| 1,450,865 | 4/1923 | Pelc | 106/213 |
| 1,647,162 | 11/1927 | Wenker | 8/524 |
| 2,087,866 | 7/1937 | Weinland et al. | 8/611 |
| 2,323,871 | 7/1943 | Kienle et al. | 8/495 |
| 2,574,597 | 11/1951 | Salvin et al. | 8/675 |
| 3,357,782 | 12/1967 | Carbonell et al. | 8/611 |
| 3,518,343 | 6/1970 | Welsh et al. | 8/524 |

FOREIGN PATENT DOCUMENTS

| | | | |
|---|---|---|---|
| 742929 | 10/1970 | Belgium | 8/524 |
| 1180343 | 10/1964 | Fed. Rep. of Germany | 8/611 |
| 851283 | 1/1940 | France . | |

*Primary Examiner*—Maria Parrish Tungol
*Attorney, Agent, or Firm*—Edward McC. Roberts

[57] ABSTRACT

New solid dyestuff preparations are disclosed consisting of an anionic dyestuff having a particle size of less than $10\mu$, a dispersing agent, a basic component, especially sodium bicarbonate, a solid acid component, preferably tartaric acid, as well as, optionally, further additives.

The new dyestuff preparations are stable in storage, and have good solubility in water, they are therefore extremely suitable for the preparation of aqueous dye liquors.

13 Claims, No Drawings

PROCESS FOR THE PRODUCTION OF DYESTUFF PREPARATIONS

This application is a continuation of application Ser. No. 880,253, filed Feb. 22, 1978 (now abandoned), which is a continuation of application Ser. No. 633,340, filed Nov. 19, 1975 (now abandoned), which is a continuation of application Ser. No. 473,046, filed May 24, 1974 (now abandoned), which is a continuation of application Ser. No. 224,936, filed Feb. 9, 1972 (now abandoned).

The present invention relates to a process for the production of dyestuff preparations from which aqueous dye liquors can be directly prepared. It concerns, in particular, dyestuff preparations of anionic dyestuffs which are reliable and simple to handle in the preparation of dye liquors. The dyestuff preparations obtainable according to the invention are, in particular, easily wettable powders readily soluble in water, and which dissolve in the dye liquor without application of heat and stirring devices.

With regard to the concentration and the resulting colouring strength of dyestuffs, it is the normal practice to pack and sell the dyestuffs mixed with fillers. The fillers present in packed dyestuff formulations are, in general, sulphate or chloride salts, dextrose, dextrin or suchlike.

Additions are also frequently made of dispersing agents, such as sodium lignin sulphonate or naphthalene/formaldehyde condensation products.

Although the application of dispersing agents facilitates the dispersion of the dyestuff there are, nevertheless, still certain disadvantages associated with the preparation of the dye liquor using such formulations. In most cases, heat is necessary to get the dyestuffs into solution. Apart from the disadvantage of the costs of heating the dye liquor, e.g. by the introduction of steam, there is the disadvantage of the precautions to be taken on applying heat to ensure that the dyestuff does not melt and agglomerate. It is, moreover, often the case that the conventional dyestuff preparations are not readily wettable; so that stirring devices are required to introduce them into the aqueous liquor.

The present invention resolves these difficulties and, furthermore, enables improved colour yields to be obtained; the same depths of colour are produced, therefore, with less dyestuff.

The present invention relates to a process for the production of dyestuff preparations, the said process being characterised in that
(a) an aqueous suspension of a dyestuff, particularly an anionic dyestuff, and a dispersing agent is subjected to a mechanical particle-size-reducing treatment until the dyestuff has a maximum particle-size of $10\mu$;
(b) the dispersed dyestuff is dried; and
(c) the dry dyestuff together with a basic carbonate or bicarbonate component and a solid acid component, and
(d) optionally further additives, is then subjected to a mixing and grinding treatment.

Anionic dyestuffs usable according to the invention are such dyestuffs of which the colouring part is an anion.

The anionic character of these dyestuffs can be induced by metal-complex formation alone, and/or acid salt-forming subtituents such as carboxylic acid groups, sulphuric acid groups and phosphoric acid groups, or the partial esters of polyvalent acids, such as sulphate and phosphate groups.

The anionic dyestuffs can belong to the most diverse classes of dyestuffs and, optionally, can also contain reduceable systems or fibre-reactive groups. This concerns, for example, salts of metal-free or heavy-metal-containing mono-, dis- or polyazo dyestuffs, including formazan dyestuffs and azomethine dyestuffs as well as anthraquinone, nitro, triphenylmethane and phthalocyanine dyestuffs.

Particularly good dyestuff preparations are obtained with metal-complexes of azo dyestuffs, such as, e.g. 1:1-nickel- or, in particular, 1:1-copper-complexes, and especially 1:2-cobalt- or -chromium-complexes, the metal being preferably bound by way of an amino group, or particularly carboxy or oxy groups, in o-position to the azo bridge. Preferred metal-complexes are symmetric and asymmetric 1:2-cobalt-or -chromium-complexes of o-carboxy-o'-hydroxy-, or particularly o,o'-dihydroxyaxo dyestuffs of the benzencazonaphthalene, benzeneazopyrazole, benzeneoxoaceteacetic acid amide and naphthaleneazonaphthalene type, whereby at least one azo dyestuff molecule of the 1:2-metal complex can optionally contain a water-solubilising group such as, e.g. a carboxylic acid or sulphonic acid group or, in particular, a sulphone- or sulphonic acid amide group, the last-mentioned being preferably unsubstituted, or mono- or disubstituted on the nitrogen atom by a lower alkyl radical. It is also possible to use mixtures of dyestuffs.

Suitable dispersing agents are non-inogenic dispersing agents such as alkylpolyglycol ether, alkenylpolyglycol ether or alkylphenylpolyglycol ether having preferably more than 20 moles of alkylene oxide, principally ethylene oxide, of which certain ones can be C-alkyl- or C-phenyl-substituted.

Preferred dispersing agents are, however, the anionic dispersing agents, e.g. naphthalenesulphonic acids, alkylated naphthalenesulphonic acids, condensation products of naphthalene-or naphtholsulphonic acids, preferably in the form of the sodium or potassium salt, or condensation products of naphthalene- or naphtholsulphonic acids and phenols, e.g. m-cresol, with formaldehyde and, in particular, ligninsulphonic acids in the form of the alkali metal salts. Mixtures of dispersing agents can also be employed, such as, e.g. a mixture of dinaphthylmethane-disulphonic acid/lignin sulphonate, or alkylphenylpolyglycol ether/lignin sulphonate.

A moist press cake of the dyestuff advantageously serves as the starting suspension for production of the dyestuff preparations according to the invention. The quantity ratio between the water and the dyestuff is adjusted to ensure that the major part of the dyestuff remains suspended, and that the suspension has a viscosity favourable for the grinding operation. In some cases, it is possible to use, as the dispersion medium, an organic medium, or also a mixture of water and an organic medium. The dyestuff must be insoluble, or soluble only to a minute degree, in this organic medium; and the organic medium itself must readily evaporate. For example, lower aliphatic alcohols, such as ethyl alcohol, are suitable as the organic medium.

In general, the part by weight of the dyestuff relative to the total weight of the suspension is between 5 and 50%, preferably between 10 and 90%.

The total proportion of dispersing agent relative to the total weight of the suspension is, as a rule, between 1 and 25%; and relative to the dyestuff it is between 5 and 100%, preferably 15–50%. In special cases, however, it can vary between wider limits.

The mechanical reduction of the particle size of the suspension obtained by the mixing together of dyestuff, dispersing agent and water can be carried out, for example, in a kneading apparatus, but preferably in a grinding mill. Particularly suitable mills for this purpose are ball-mills, Attritor- or sand-mills. The grinding is continued until the major proportion (i.e. at least ca. 90% of the amount of dyestuff used) has a maximum particle size of $10\mu$. The maximum of the particle-distribution curve is then below $5\mu$, preferably below 1.

The suspension obtained after the mechanical reducing operation is then carefully dried in such a manner that an agglomeration of the dyestuff particles is avoided. The careful drying treatment can be performed, for example, by sublimation, i.e. by vacuum freeze drying, or by concentration by evaporation, e.g. by oven drying, Venuleth drying or spray drying. Pulverulent dispersed dyestuffs are obtained which, after their introduction into the dye bath, have a maximum dyestuff-particle size of $10\mu$, and preferably of not more than $5\mu$. These finely dispersed dyestuff powders together with a basic carbonate and bicarbonate component and a solid acid component, and, optionally, with further additives such as with a filler and a wetting agent, are subjected according to the invention to a mixing and grinding treatment.

The basic component is preferably a carbonate or a bicarbonate of ammonium, of an alkali metal or of an alkaline-earth metal, e.g. ammonium carbonate, ammonium bicarbonate, sodium carbonate, sodium bicarbonate, potassium bicarbonate, calcium carbonate or magnesium carbonate.

The acid component can be any inorganic or organic acid which is stable in solid form under normal conditions. Such acids are, e.g. solid sulphonic acids such as sulphamic acid, or solid carboxylic acids such as oxalic acid, succinic acid, glutaric acid, citric acid, glyoxylic acid, glycolic acid, lactic acid and, in particular, tartaric acid. Furthermore, it is possible to use an acid salt, e.g. salts of polyvalent acids, such as sodium bisulphate.

As further additives, the usual fillers may be used such as dextrin, sodium chloride, trisodium phosphate or sodium sulphate, as well as, optionally, anti-dust agents. The carbonate or the bicarbonate and the acid component can also act as fillers or extenders. An addition can also be made of tensides, e.g. sodium dodecylbenzenesulphonate, or the sodium salt of oleyl methyl tauride, in order to improve wetting; as well as, optionally, wetting agents such as dibutylnaphthalene sulphonate.

The weight ratio of individual components in the dyestuff preparation can vary greatly: for the dyestuff it can be within 20–70 percent by weight, for the dispersing agent within 5–30 percent by weight, for the carbonate or bicarbonate component within 1.5–20 percent by weight, and for the acid component within 1.5–10 percent by weight, and, for further additives, e.g. extenders and fillers, it can overall be within 0–65 percent by weight.

The amount of dyestuff can be varied depending on the inherent solubility and dyeing properties of the particular dyestuff employed, on the desired depth of colour, and on the presence and amount of other dyeing auxiliaries. The ratio of carbonate or bicarbonate to acid can also be varied.

The ratio of carbonate or bicarbonate to the acid component is advantageously adjusted to obtain the highest possible rate of carbon dioxide evolution. In most applications, the weight ratio of the basic to the acid component is 1:1 to 2:1, preferably about 1:1.

If dyestuffs having acid salt-forming groups are used, then it is advantageous for the dyestuff to be used in the free acid form and not in the salt form. In this case, the dyestuff itself serves as the acid component, and the presence of this component is necessary only in a small amount.

Dyestuff preparations obtainable according to the invention which prove very satisfactory contain in the form of dry powders, relative to the total weight, 20 to 50 percent by weight of anionic dyestuff, 8 to 25 percent by weight of an anionic dispersing agent, particularly a lignin sulphonate; 4 to 10 percent by weight of ammonium carbonate or of a bicarbonate of ammonium, of an alkali metal or of an alkaline-earth metal, especially sodium bicarbonate; and 2 to 5 percent by weight of a solid carboxylic acid, particularly tartaric acid; and 10 to 60 percent by weight of fillers.

The mixing and the grinding of the dry and dispersed dyestuffs with the carbonate or bicarbonate, the solid acid component, and, optionally, further additives, is carried out in conventional powder-mixing devices, such as in a drum, in a ribbon blender, or in a ball mill or roller mill, wherein the components are homogeneously mixed and ground.

The dyestuff preparations obtainable according to the invention are storage-stable homogeneous powders directly ready for use which wet very rapidly and readily dissolve when introduced into water at 10°–30° C. Their cold-water-solubility (determined by the method of Cappeai and Pfister Textilveredlung 1967, No. 1) is appreciably better than that of the usual commercial products consisting of dyestuff and the conventional fillers. Their cold-water solubility at 20° C. is 30 to 100 g/l compared with 5–10 g/l for the usual commercial products.

When the powders (1 g) are applied to the surface of water, they are wetted within a few seconds without stirring being required, whereas the usual dyestuff powders generally need several minutes to become wetted.

For the production of lye liquors, the dyestuff preparations according to the invention have merely to be added to an aqueous medium. As a result of the evolution of carbon dioxide which then takes place, there occurs, on the one hand, an improvement in the wetting of the dyestuff-particles and, on the other hand, an acceleration of the decomposition of the dyestuff-agglomerates and -aggregates into the very fine primary particles, which produces a very rapid dispersion and dissolving of the dyestuff. In cases where it would normally be necessary to apply heat, this is no longer necessary, or only to a considerably less extent. The foam formed in consequence of the evolution of carbon dioxide disappears after a short time. After completion of the foaming, the thus obtained dyestuff solution is adjusted with water to the desired concentration, and dyeing is performed in the usual manner. Printing too is carried out by conventional methods. A printing paste is employed for this purpose which can contain, in addition to the above mentioned dyestuff solution and thickener, usual additives, e.g. benzyl alcohol, chlorophenoxyethanol, or acid.

The following examples illustrate the invention without the invention being limited to the given examples.

The temperatures are expressed therein in degrees Centigrade.

EXAMPLE 1

An amount of 100 g of moist press cake of the dyestuff of the formula:

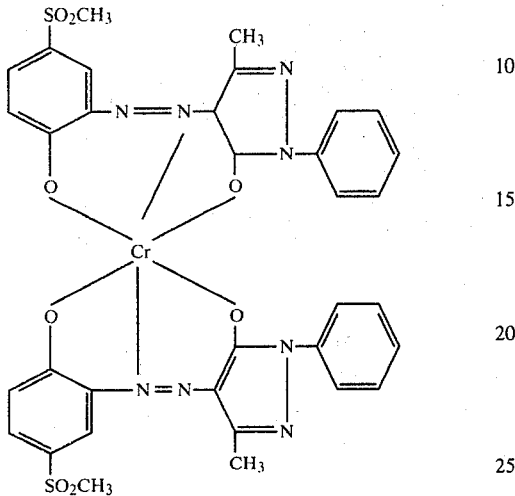

consisting of 25 g of dry dyestuff and 75 g of water together with 10 g of a lignin sulphonate is ground in a high-speed ball mill containing glass beads (diameter 1 mm) until a maximum particle-size of 5μ is obtained. This finely dispersed dyestuff mixture is then dried in vacuo. An amount of 28.8 g of the dry and finely dispersed dyestuff, consisting of 20.6 g of dyestuff and 8.2 g of lignin sulphonate, is then mixed and ground with 4.8 g of tartaric acid, 4.8 g of sodium bicarbonate, 30.8 g of dextrin and 30.8 g of crisodium phosphate in a suitable powder-mixing-and-grinding apparatus. The obtained powder mixture has a cold water solubility at 20° C. of 40 g/l. When the preparation is sprinkled into cold water, there occurs a rapid wetting of the preparation with foaming. The foam caused by the evolution of carbon dioxide, however, collapses after a few seconds. By this means is obtained a directly usable liquor for the dyeing of wool in orange shades.

EXAMPLE 2

The process of Example 1 is repeated; instead of the therein employed amounts of components, however, a mixture is used consisting of 71.2 g of the dispersed dyestuff powder having a maximum particle-size of 5μ, this mixture being made up of 50.8 g of the dyestuff and 20.4 g of lignin sulphonate, and 4.8 g of tartaric acid, 4.8 g of sodium bicarbonate, 9.6 g of dextrin and 9.6 g of trisodium phosphate. The thus obtained dyestuff preparation is 2.5 times stronger with regard to dyestuff content, and appreciably more readily wettable than the corresponding equally strong commercial product consisting of dyestuff and fillers. The cold-water-solubility is 30 g/l compared with less than 5 g/l in the case of the conventional commercial product.

EXAMPLE 3

An amount of 28.8 g of the dispersed dyestuff powder obtained according to Example 1 is homogeneously mixed and ground with 4.8 g of tartaric acid, 4.8 g of sodium bicarbonate, 10.2 g of oleylmethyltauride sodium salt, and 50.5 g of dextrin. This dyestuff preparation is more readily wettable than the corresponding conventional commercial product, and has a cold-watersolubility at 20° C. of 80 g/l.

EXAMPLE 4

An amount of 60 g of moist press cake of the dyestuff of the formula:

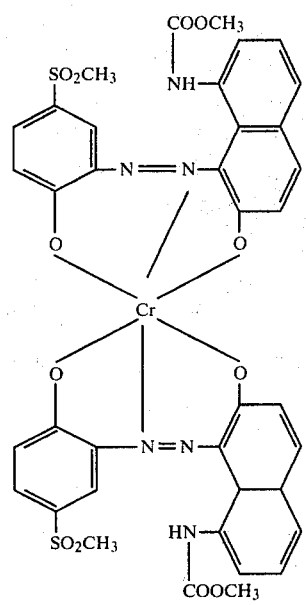

consisting of 30 g of dyestuff and 30 g of water is ground together with 12 g of a lignin sulphonate in a high-speed ball mill, containing 1 mm dia. glass beads, to obtain a maximum particle-size of 5μ. This finely dispersed dyestuff mixture is subsequently carefully dried in a spray drying apparatus in such a manner that no irreversible agglomeration occurs.

An amount of 37.4 g of the obtained finely dispersed dyestuff powder consisting of 26.7 g. of dyestuff and 10.7 g of lignin sulphonate is homogeneously mixed and ground, in a grinding and mixing apparatus, with 4.8 g of tartaric acid, 4.8 g of sodium bicarbonate, 26.5 g of dextrin and 26.5 g of trisodium phosphate.

The obtained dyestuff preparation has a solubility in water at 20° C. of 40 g/l. On addition of the preparation to cold water, a direclty usable liquor is obtained which dyes wool, in the usual manner, in grey shades.

If, instead of 12 g of a lignin sulphonate, equivalent amounts of a mixture of dispersing agents such as dinaphthylmethanedisulphonic acid/lignin sulphonate, or alkylphenylpolyglycol ether/lignin sulphonate, are used, the procedure being otherwise analogous to that described in Example 4, then an equally good dyestuff preparation is obtained.

EXAMPLE 5

An amount of 75.0 g of the dispersed dyestuff powder obtained according to Example 4 and consisting of 53.5 g of dyestuff and 21.5 g of lignin sulphonate is mixed and ground, in a suitable grinding and mixing apparatus, with 4.8 g of tartaric acid, 4.8 g of sodium bicarbonate, 7.7 g of dextrin and 7.7 g of trisodium phosphate. The thus obtained dyestuff preparation is, regarding colouring strength, twice as strong as that of Example 4. It wets very well with water, and has a solubility in water at 20° C. of 40 g/l.

EXAMPLE 6

37.4 g of the dispersed dyestuff obtained according to Example 4 are homogeneously mixed and ground with 4.8 g of tartaric acid, 4.8 g of sodium bicarbonate, 8.8 g of the sodium salt of oleylmethyltauride, and 43.1 g of dextrin. The obtained dyestuff preparation has a cold-water-solubility at 20° C. of 60 g/l.

EXAMPLE 7

An amount of 83.4 g of a dyestuff powder obtained according to the procedure described in Example 1 having a maximum particle size of 5μ and consisting of 59.6 g of a dyestuff of the formula:

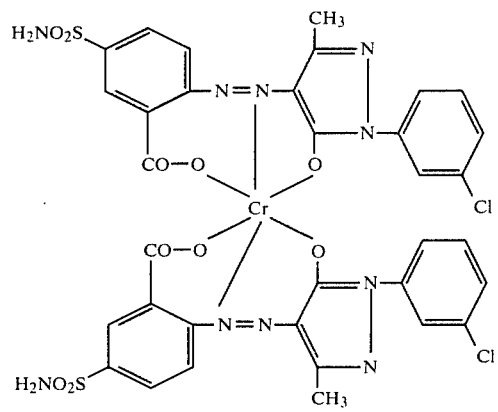

and 23.8 g of sodium lignin sulphonate is homogeneously ground and mixed with 4.8 g of tartaric acid, 4.8 g of sodium bicarbonate and 7.0 g of sodium dodecylbenzenesulphonate.

The obtained dyestuff preparation has a cold-water-solubility at 20° C. of 60 g/l. The preparation is sprinkled into cold water (20° C.) to obtain a directly usable dye liquor, which dyes wool, in the usual manner, in yellow shades.

EXAMPLE 8

An amount of 59.8 g of a dyestuff powder obtained according to the procedure described in Example 1 having a maximum particle size of 5μ and consisting of 42.7 g of a dyestuff mixture of the formula:

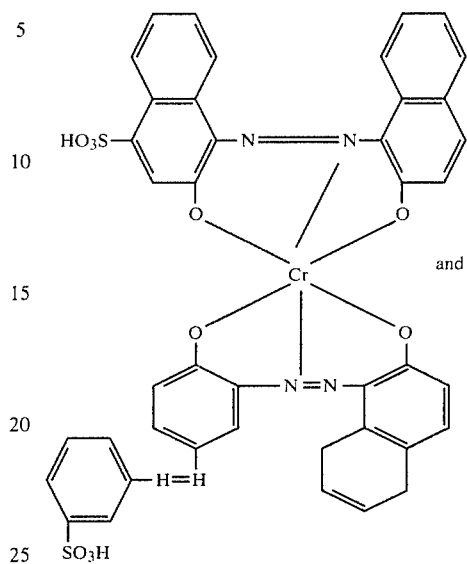

and

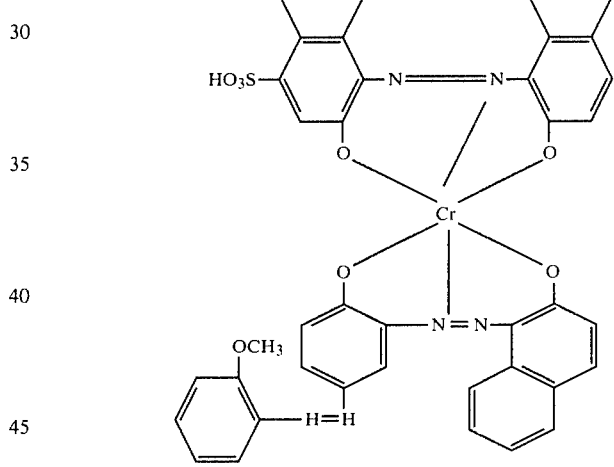

and 17.1 g of a sodium lignin sulphonate are homogeneously mixed and ground with 4.8 g of sodium bicarbonate, 4.8 g of tartaric acid and 30.6 g of dextrin. The obtained dyestuff preparation has a cold-water-solubility at 20° C. to 60 g/l. By the sprinkling of the preparation into cold water (20° C.), a directly usable dye liquor is obtained which dyes wool, in the usual manner, in black shades.

EXAMPLE 9

An amount of 125 g of a dyestuff of the formula:

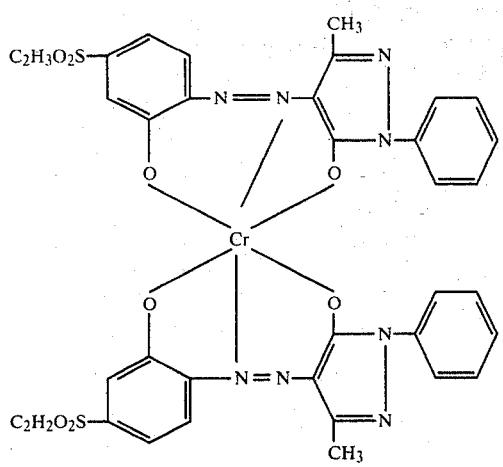

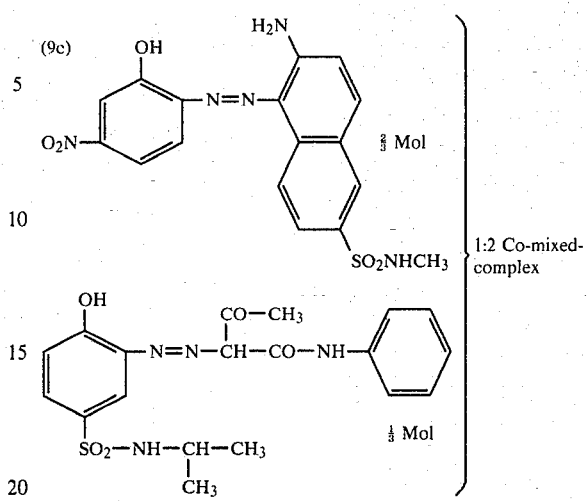

is suspended in a solution of 50 g of sodium lignin sulphonate in 375 g of water. This suspension is then transferred to a ball mill in which the dyestuff is ground to obtain a maximum particle size of $5\mu$. The obtained dyestuff mixture is subsequently carefully dried in a vacuum oven.

75.4 g of the dry finely dispersed dyestuff consisting of 53.9 g of dyestuff and 21.6 g of sodium lignin sulphonate are then homogeneously mixed and ground with 4.8 g of tartaric acid, 4.8 g of sodium bicarbonate, 5.0 g of the sodium salt of dedecylbenxenesulphonate 5.0 g of sodium hexametaphesphate and 5.2 g of dextrin. The obtained dyestuff preparation has a cold-water-solubility at 20° C. of 60 g/l. The preparation is sprinkled into cold water (20° C.) to obtain a directly usable dye liquor which dyes wool, in the usual manner, in red shades.

If, instead of the above 1:2-chromium complex dyestuff, equivalent amounts of one of the following 1:2-cobalt complex dyestuffs are used, the procedure being otherwise analogous to that described in Example 9, then equally good dyestuff preparations are obtained:

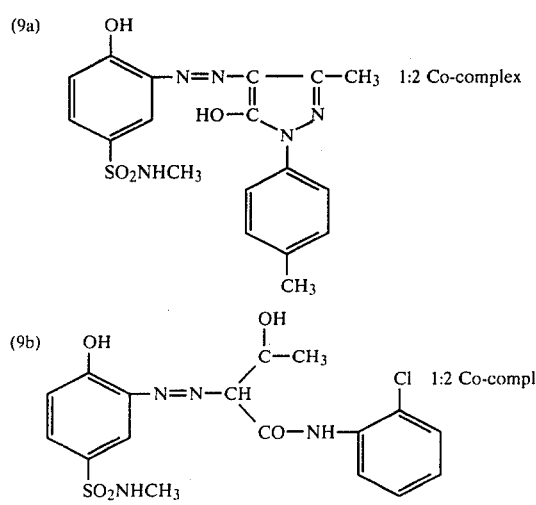

If, instead of tartaric acid, equivalent amounts of citric acid are used, with otherwise the same procedure, then equally good dyestuff preparations are obtained.

EXAMPLE 10

An amount of 150 g of dry dyestuff of the formula:

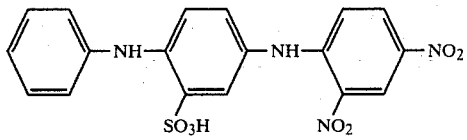

with the addition of 170 g of water and 60 g of a sodium lignin sulphonate is finely dispersed in a sand mill or glass-bead mill until a maximum particle-size of $3\mu$ is obtained. This dispersion is subsequently carefully dried in a laboratory paddle drier at 60° to 70°. 176.4 g of the obtained finely dispersed powder are homogeneously mixed and ground with 7 g of sodium bicarbonate, 7 g of tartaric acid, 5.6 g of dextrin and 2 g of dibutylnaphthalene sulphonate, as well as, if required, with an anti-dust agent. The obtained dyestuff preparation has at 20° a solubility of 60 g/l, and wets immediately when placed into water.

EXAMPLE 11

An amount of 200 g of a dyestuff of the formula:

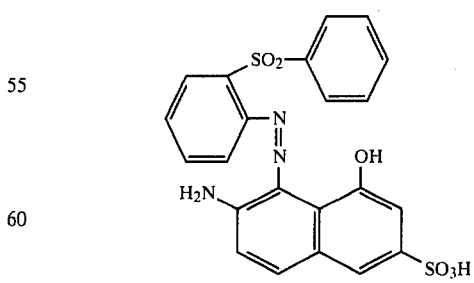

together with 240 g of water and 80 g of a sodium lignin sulphonate is dispersed in a sand mill or glass-bead mill until the particle-size of the dyestuff is under $3\mu$. Instead of dry dyestuff, moist filter cake can also be advantageously used, in this case, however, the required addition of water must be calculated in accordance with the water content of the filter cake. To avoid agglomeration, this finely dispersed mass is immediately carefully dried in a spray drier, or in some other drying apparatus, so as to avoid the occurrence of any irreversible agglomeration. Of this finely dispersed powder, 183.5 g, containing 131.1 g of dyestuff and 52.4 g of lignin sulphonate, with 7 g of tartaric acid, 7 g of sodium bicarbonate and 2.5 g of an anti-dust agent, are homogeneously mixed and ground. The cold-water solubility of the obtained dyestuff preparation is 60 g/l, compared with 5 g/l for the normal commercial product.

If, instead of the monoaze dyestuff of the above formula, equivalent amounts of the dyestuff of the formula:

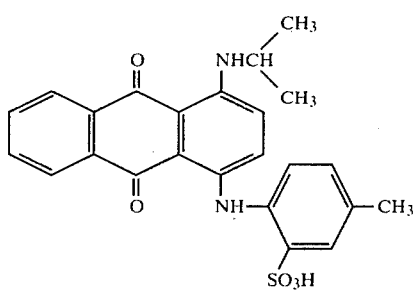

are employed, with the procedure otherwise analogous to that described in Example 11, then an equally good dyestuff preparation is obtained.

We claim:

1. A process for the production of dyestuff compositions, comprising the sequential steps of
   (a) subjecting an aqueous suspension of a water-soluble dyestuff and a dispersing agent to a mechanical particle-size-reducing treatment until the dyestuff has a maximum particle size of 10 microns,
   (b) drying the dyestuff, and
   (c) mixing the dry dyestuff with a basic carbonate or bicarbonate material and a solid acid material.

2. A process of claim 1, wherein the dyestuff is an acid dyestuff or a metal-complex of an azo dyestuff.

3. A process of claim 2, wherein the metal-complex of the azo dyestuff is a 1:2-cobalt- or 1:2-chromium-complex thereof.

4. A process of claim 2, wherein the dispersing agent is an alkali metal salt of ligninsulphonic acid.

5. A process according to claim 4, wherein the basic material is sodium bicarbonate, and the acid material is tartaric acid.

6. A process of claim 1, wherein the maximum particle size of the dyestuff after step (a) is 5 microns.

7. A process of claim 1, wherein the dispersing agent is an alkali metal salt of ligninsulphonic acid.

8. A process of claim 1, wherein the composition comprises 20 to 70% by weight of anionic dyestuff, 5 to 30% by weight of the dispersing agent, 1.5 to 20% by weight of the carbonate or bicarbonate material, and 1.5 to 10 % by weight of the acid component.

9. A process of claim 8, wherein the composition comprises 20 to 50% by weight of anionic dyestuff, 8 to 25% by weight of sodium bicarbonate, 2 to 5% by weight of tartaric acid, and 10 to 60% by weight of filler material.

10. A dyestuff composition prepared according to the process of claim 1.

11. The dyestuff composition of claim 10, comprising a dyestuff having a maximum particle size in the range of 5 to 10 microns, a dispersing agent, a basic carbonate or bicarbonate material, and a solid acid material.

12. The dyestuff composition of claim 11, comprising 20 to 70% by weight of an anionic dyestuff, 5 to 30% by weight of an anionic dispersing agent, 1.5 to 20% by weight of a basic carbonate or bicarbonate material and, 1.5 to 10% by weight of a solid acid material.

13. The dyestuff composition of claim 12, comprising 20 to 50% by weight of an acid dyestuff or a 1:2-cobalt- or 1:2-chromium-complex of an azo dyestuff, 8 to 25% by weight of an alkali metal salt of ligninsulphonic acid, 4 to 10% by weight of sodium bicarbonate, 2 to 5% by weight of tartaric acid, and 10 to 60% by weight of filler material.

* * * * *